United States Patent
Saleh et al.

(10) Patent No.: US 10,897,585 B2
(45) Date of Patent: Jan. 19, 2021

(54) HYPERSPECTRAL IMAGING SYSTEM AND METHOD FOR PROVIDING A HYPERSPECTRAL IMAGE OF AN AREA OF A REMOTE OBJECT

(71) Applicant: Corning Incorporated, Corning, NY (US)

(72) Inventors: Mohammad A. Saleh, Keene, NH (US); Patrick Wallace Woodman, Marlborough, NH (US)

(73) Assignee: Corning Incorporated, Corning, NY (US)

(*) Notice: Subject to any disclaimer, the term of this patent is extended or adjusted under 35 U.S.C. 154(b) by 99 days.

(21) Appl. No.: 16/183,026

(22) Filed: Nov. 7, 2018

(65) Prior Publication Data

US 2019/0182441 A1 Jun. 13, 2019

Related U.S. Application Data

(60) Provisional application No. 62/595,813, filed on Dec. 7, 2017.

(51) Int. Cl.

| | |
|---|---|
| H04N 5/33 | (2006.01) |
| G01J 3/28 | (2006.01) |
| G01J 3/02 | (2006.01) |
| G02B 6/42 | (2006.01) |
| G01J 3/04 | (2006.01) |
| F21V 8/00 | (2006.01) |
| G02B 6/08 | (2006.01) |

(52) U.S. Cl.
CPC ............ *H04N 5/332* (2013.01); *G01J 3/0205* (2013.01); *G01J 3/0221* (2013.01); *G01J 3/0229* (2013.01); *G01J 3/04* (2013.01); *G01J 3/2823* (2013.01); *G02B 6/42* (2013.01); *G02B 6/4215* (2013.01); *G01J 2003/2826* (2013.01); *G02B 6/0076* (2013.01); *G02B 6/08* (2013.01)

(58) Field of Classification Search
CPC ...... H04N 5/332; G01J 3/0205; G01J 3/0221; G01J 3/0229; G01J 3/04; G01J 3/2823; G01J 2003/2826; G02B 6/42; G02B 6/4215; G02B 6/08
See application file for complete search history.

(56) References Cited

U.S. PATENT DOCUMENTS

| | | | |
|---|---|---|---|
| 7,052,150 B2 | 5/2006 | Dewald | |
| 9,442,012 B2 | 9/2016 | Mann et al. | |
| 2001/0008470 A1* | 7/2001 | Dewald | G02B 6/4298 359/850 |
| 2012/0212737 A1* | 8/2012 | Comstock, II | G01J 3/0218 356/326 |

(Continued)

OTHER PUBLICATIONS

Beckert et al. "Multi-resolution waveguide image slicer for the PEPSI instrument", Proceedings of SPIE 9912, 2016, pp. 1-8.

(Continued)

*Primary Examiner* — Jamil Ahmed
(74) *Attorney, Agent, or Firm* — Amy T. Lang; Kevin L. Bray (57) ABSTRACT

A hyperspectral imaging system and method are described herein for providing a hyperspectral image of an area of a remote object. In one embodiment, the hyperspectral imaging system includes an optic, a stack of waveguide plates, a spectral filter array, a detector array, and a controller.

20 Claims, 7 Drawing Sheets

(56) References Cited

U.S. PATENT DOCUMENTS

2013/0321808 A1  12/2013  Comstock, II et al.
2015/0253190 A1   9/2015  Seo et al.
2016/0245698 A1   8/2016  Pau et al.

OTHER PUBLICATIONS

International Search Report and Written Opinion PCT/US2018/064188 dated Mar. 20, 2019, 12 PGS.

* cited by examiner

FIG. 6B

HYPERSPECTRAL IMAGING SYSTEM AND METHOD FOR PROVIDING A HYPERSPECTRAL IMAGE OF AN AREA OF A REMOTE OBJECT

This application claims the benefit of priority to the U.S. Provisional Application Ser. No. 62/595,813 filed on Dec. 7, 2017, the content of which is relied upon and incorporated herein by reference in its entirety.

TECHNICAL FIELD

The present disclosure relates to a hyperspectral imaging system and method for providing a hyperspectral image of an area of a remote object. In one embodiment, the hyperspectral imaging system includes an optic, a stack of waveguide plates, a spectral filter array, a detector array, and a controller. The present disclosure also relates to the stack of waveguide plates.

BACKGROUND

Currently there are two main types of hyperspectral imaging systems. One type of hyperspectral imaging system utilizes Offner or Dyson spectrometers (i.e., complex optical solution). Another type of hyperspectral imaging system utilizes filter arrays directly on a camera focal plane (i.e., scalable filter solution). Each type of hyperspectral imaging system has advantages and disadvantages when compared to one another. For instance, the hyperspectral imaging system that utilizes Offner or Dyson spectrometers has the following advantages (for example): higher spectral resolution and capability of acquiring all wavelengths at the same time. The hyperspectral imaging system that utilizes Offner or Dyson spectrometers also has the following disadvantages (for example): complex optical systems that can be expensive to make, higher costs, larger system, and lack of scalability. In contrast, the hyperspectral imaging system that utilizes filter arrays directly on a camera focal plane has the following advantages (for example): easily scalable, compact, less expensive, and higher spatial resolution (linear filter). The hyperspectral imaging system that utilizes filter arrays directly on a camera focal plane also has the following disadvantages (for example): limited spectral resolution, limited collection of light to only a single wavelength at a time for a particular pixel, and additional data processing to match the spatial data with the spectral data. The additional data processing and limited light collection increase the time required for image acquisition. Further, the hyperspectral imaging system that utilizes filter arrays directly on a camera focal planes is typically limited to applications where the object being imaged is stationary. When used in applications where the object is not stationary, complex data processing algorithms must be used and lead to errors in the imaging of the object. The present disclosure introduces a new hyperspectral imaging system which essentially allows the scalable filter array solution to function like the complex optical system solution while having the best features of both of the current scalable filter array solution and the complex optical system solution.

SUMMARY

A hyperspectral imaging system and a method for providing a hyperspectral image of an area of a remote object have been described in independent claims of the present application. In addition, a stack of waveguide plates has been described in an independent claim of the present application. Advantageous embodiments of hyperspectral imaging system and the method for providing a hyperspectral image of an area of a remote object have been described in the dependent claims.

In one aspect, the present disclosure provides a hyperspectral imaging system which comprises: (i) an optic; (ii) a plurality of waveguide plates, wherein each of the waveguide plates are stacked on top of one another, and wherein the stacked waveguide plates have a slit located thereon; (iii) a spectral filter array; and, (iv) a detector array, wherein the stacked waveguide plates are positioned between the optic and the spectral filter array, and wherein the spectral filter array is positioned between the stacked waveguide plates and the detector array.

In another aspect, the present disclosure provides a method for providing a hyperspectral image of an area of a remote object. The method comprises a step of providing a hyperspectral imaging system which includes: (i) an optic; (ii) a plurality of waveguide plates, wherein each of the waveguide plates are stacked on top of one another, and wherein the stacked waveguide plates have a slit located thereon; (iii) a spectral filter array; and, (iv) a detector array, wherein the stacked waveguide plates are positioned between the optic and the spectral filter array, and wherein the spectral filter array is positioned between the stacked waveguide plates and the detector array. The method further comprises a step of positioning the hyperspectral imaging system with respect to the remote object system such that: (i) the optic receives light associated with the area of the remote object, and outputs light associated with the area of the remote object; (ii) the slit located at an entrance end of the stacked waveguide plates receives at least a portion of the light output from the optic, and an exit end opposite the entrance end of the stacked waveguide plates outputs multiple dispersed lights where each one of the waveguide plates outputs one of the multiple dispersed lights; (iii) the spectral filter array receives the multiple dispersed lights output from the exit end of the stacked waveguide plates, and outputs multiple arrays of different wavelength filtered lights where each one of the multiple dispersed lights is associated with one of the multiple arrays of different wavelength filtered lights; (iv) the detector array receives the multiple arrays of different wavelength filtered lights from the spectral filter array, and outputs multiple arrays of electrical signals where each one of the multiple arrays of different wavelength filtered lights is associated with one of the multiple arrays of electrical signals; and (v) the controller receives the multiple arrays of electrical signals from the detector array, combines the multiple arrays of electrical signals to generate the hyperspectral image of the area of the remote object, and outputs the hyperspectral image of the area of the remote object.

In yet another aspect, the present disclosure provides a specially configured waveguide comprising: a plurality of waveguide plates, wherein each of the waveguide plates are stacked on top of one another, wherein the stacked waveguide plates have a slit located thereon, wherein the stacked waveguide plates have an entrance end which has a coating located thereon except for the slit which is located on the entrance end and does not have the coating thereon, wherein each waveguide plate has a rectangular shape, and wherein each waveguide plate has an entrance pupil which forms a portion of the slit.

Additional aspects of the disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

A more complete understanding of the present disclosure may be had by reference to the following detailed description when taken in conjunction with the accompanying drawings wherein.

DETAILED DESCRIPTION

Figure 1A:
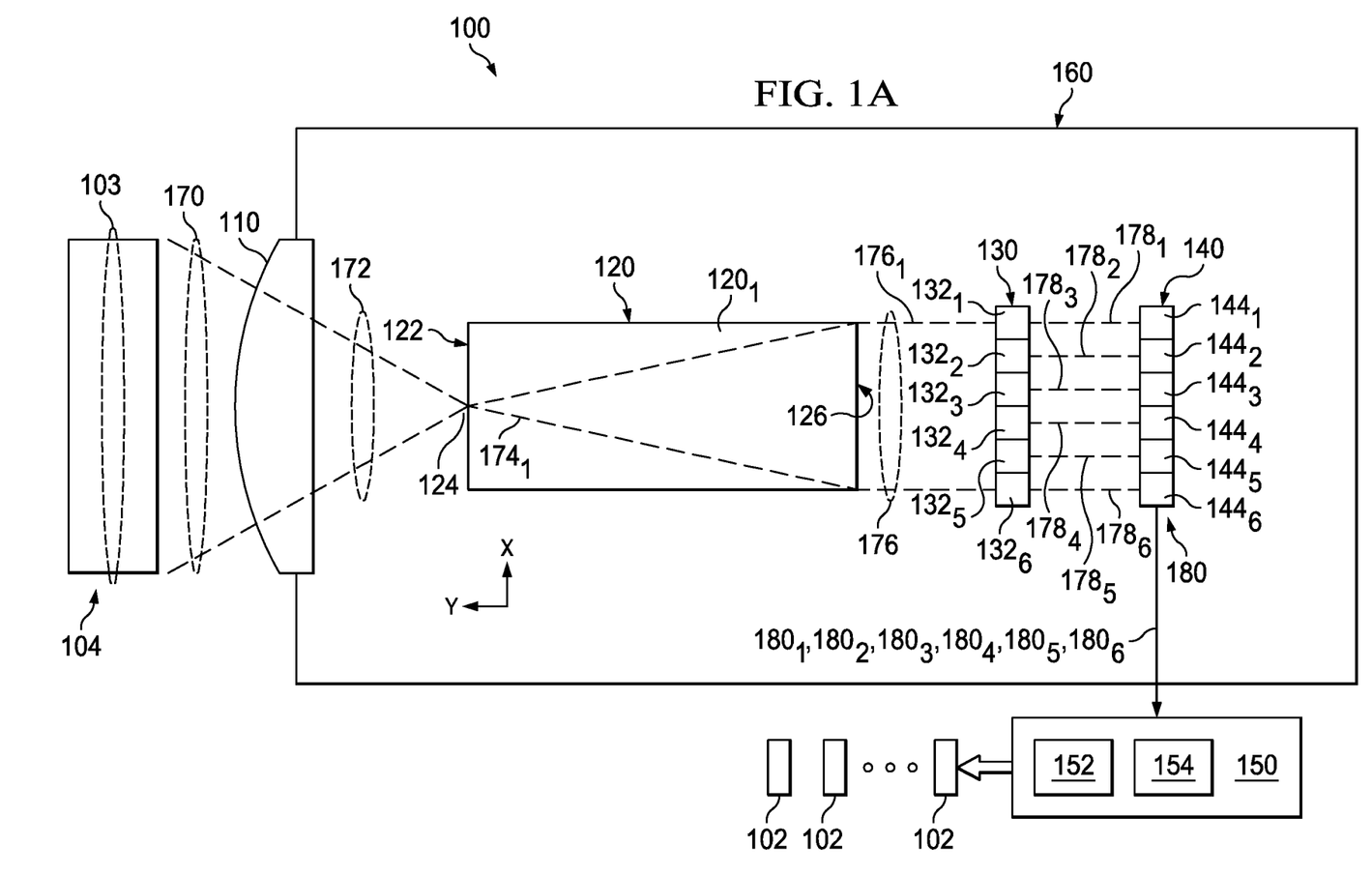
FIG. 1A (top view) and FIG. 1B (side view) illustrate the basic components of an exemplary hyperspectral imaging system configured to provide a hyperspectral image of an area of a remote object in accordance with an embodiment of the present disclosure.
Figure 1B:
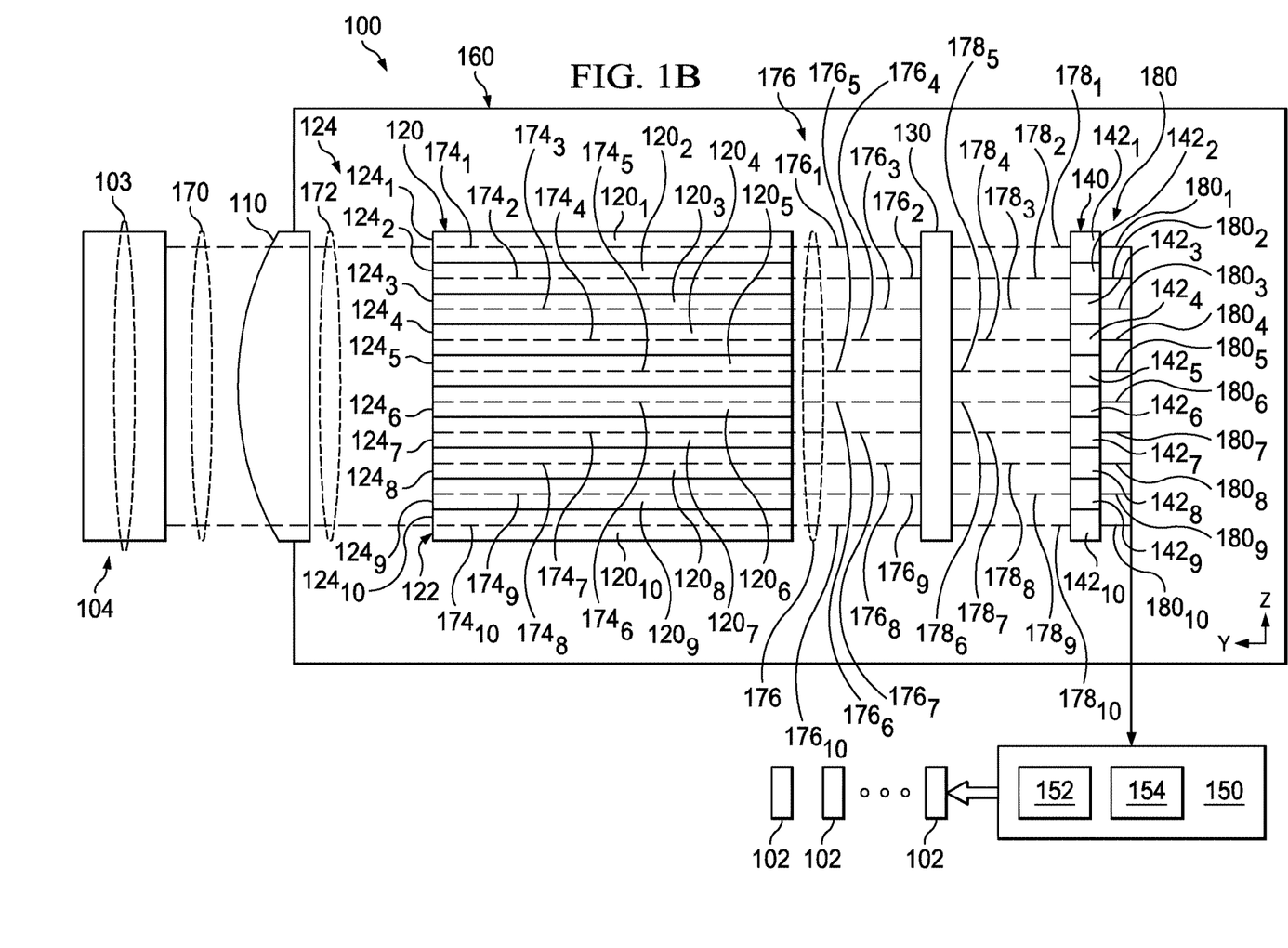

Referring to FIG. 1A and FIG. 1B, there are diagrams illustrating the basic components of an exemplary hyperspectral imaging system 100 configured to provide a hyperspectral image 102 of an area 103 of a remote object 104 in accordance with an embodiment of the present disclosure. As shown in FIG. 1A (top view) and FIG. 1B (side view), the hyperspectral imaging system 100 includes a optic 110 (e.g., a lens), stacked waveguide plates $120_1$, $120_2$, $120_3$, $120_4$, $120_5$, $120_6$, $120_7$, $120_8$, $120_9$, $120_{10}$ (only ten waveguide plates shown—but there can be any number of waveguide plates 1200, a spectral filter array 130, a detector array 140 (e.g., camera focal plane array 140), and a controller 150. The waveguide plates $120_1$, $120_2$, $120_3$, $120_4$, $120_5$, $120_6$, $120_7$, $120_8$, $120_9$, $120_{10}$ (referred to herein collectively as the stacked waveguide plates 120) have an entrance end 122 with a slit 124 formed thereon, and an exit end 126 which is opposite the entrance end 122. The stacked waveguide plates 120 are positioned between the optic 110 and the spectral filter array 130. The spectral filter array 130 is positioned between the stacked waveguide plates 120 and the detector array 140. The controller 150 is coupled to the detector array 140. Furthermore, the hyperspectral imaging system 100 may include a housing 160 which encloses and supports the optic 110, the stacked waveguide plates 120, the spectral filter array 130, and the detector array 140. In this example, the controller 150 is shown as being positioned outside of the housing 160 but is still operatively coupled to at least the detector array 140. The hyperspectral imaging system 100 can incorporate other components that are well known to those skilled in the art, but for clarity only those components 110, $120_1$, $120_2$, $120_3$, $120_4$, $120_5$, $120_6$, $120_7$, $120_8$, $120_9$, $120_{10}$, 130, 140, and 150 needed to explain and enable the present disclosure are discussed in detail herein.

Figure 2:
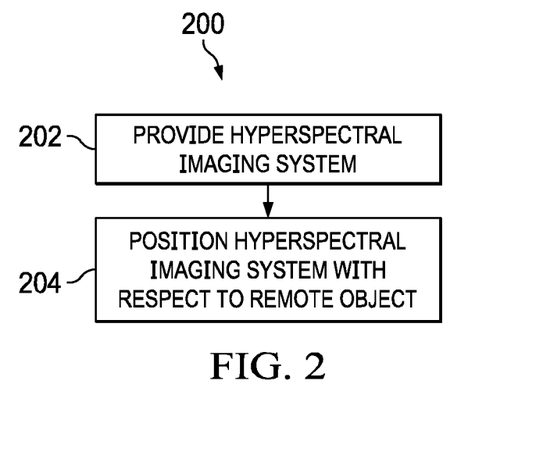
FIG. 2 is a flowchart illustrating the steps of an exemplary method for using the hyperspectral imaging system shown in FIG. 1A and FIG. 1B to provide a hyperspectral image of an area of a remote object in accordance with an embodiment of the present disclosure.

Referring to FIG. 2, there is a flowchart illustrating the steps of an exemplary method 200 for using the hyperspectral imaging system 100 to provide the hyperspectral image 102 of the area 103 of the remote object 104 in accordance with an embodiment of the present disclosure. The hyperspectral imaging system 100 is provided (step 202) and positioned (step 204) with respect to the remote object 104 such that the optic 110 is able to receive light 170 associated with the area 103 of the remote object 104, and output light 172 associated with the area 103 of the remote object 104. The slit 124 located on the entrance end 122 of the stacked waveguide plates 120 receives at least a portion of the light 172 which is output from the optic 110. The exit end 126 of the stacked waveguide plates 120 outputs multiple dispersed lights 176, individually referred to as $176_1$, $176_2$, $176_3$, $176_4$, $176_5$, $176_6$, $176_7$, $176_8$, $176_9$, $176_{10}$ (e.g., one dispersed light is output from each one of the waveguide plates $120_1$, $120_2$, $120_3$, $120_4$, $120_5$, $120_6$, $120_7$, $120_8$, $120_9$, $120_{10}$). The spectral filter array 130 receives the multiple dispersed lights $176_1$, $176_2$, $176_3$, $176_4$, $176_5$, $176_6$, $176_7$, $176_8$, $176_9$, $176_{10}$ output from the exit end 126 of the stacked waveguide plates 120, and outputs multiple arrays of different wavelength filtered lights 178, individually referred to as $178_i$. In FIG. 2, $178_1$, $178_2$, $178_3$, $178_4$, $178_5$, $178_6$ (e.g., 10 arrays (which correspond to the 10 waveguide plates $120_1$, $120_2$, $120_3$, $120_4$, $120_5$, $120_6$, $120_7$, $120_8$, $120_9$, $120_{10}$) of 6 different wavelength filtered lights 1780 are shown—but there can be any number of arrays and any number of different wavelength filtered lights 178. The detector array 140 receives the multiple arrays of different wavelength filtered lights $178_1$, $178_2$, $178_3$, $178_4$, $178_5$, $178_6$ from the spectral filter array 130, and outputs multiple arrays of electrical signals 180, individually referred to as $180_i$. In FIG. 2, $180_1$, $180_2$, $180_3$, $180_4$, $180_5$, $180_6$ (e.g. 10 arrays of 6 electrical signals 180 corresponding to the 10 arrays of 6 wavelength filtered lights 178) are shown—but there can be any number of arrays and any number of electrical signals 180. The controller 150 receives the multiple arrays of electrical signals $180_1$, $180_2$, $180_3$, $180_4$, $180_5$, $180_6$ from the detector array 140. The controller 150 then processes the multiple arrays of electrical signals $180_1$, $180_2$, $180_3$, $180_4$, $180_5$, $180_6$ to generate the hyperspectral image 102 of the area 103 of the remote object 104. Thereafter, the controller 150 outputs the hyperspectral image 102 of the area 103 of the remote object 104. The hyperspectral imaging system 100 can be repeatedly operated in the above described manner to obtain different hyperspectral images 102 of different areas 103 of the remote object 104.

The hyperspectral imaging system 100 is operable such that the optic 110 directs the light 172 to the slit 124 in the stacked waveguide plates 120. Each waveguide plate $120_1$, $120_2$, $120_3$, $120_4$, $120_5$, $120_6$, $120_7$, $120_8$, $120_9$, $120_{10}$ has a refractive index that reduces the angle of refraction of its specific received portion of light 172 and therein spreads the respective specific portion of light $174_1$, $174_2$, $174_3$, $174_4$, $174_5$, $174_6$, $174_7$, $174_8$, $174_9$, $174_{10}$ in only one direction (e.g., x-direction as shown in FIG. 1A). At the exit end 126 of the stacked waveguide plates 120, the spectral filter array 130 with a multitude of different wavelength passband filters $132_1$, $132_2$, $132_3$, $132_4$, $132_5$, $132_6$ (for example) is arranged to receive and only allow specific wavelengths of the received dispersed light $176_1$, $176_2$, $176_3$, $176_4$, $176_5$, $176_6$, $176_7$, $176_8$, $176_9$, $176_{10}$ to pass there through as arrays of different wavelength filtered lights $178_1$, $178_2$, $178_3$, $178_4$, $178_5$, $178_6$. At the output end of the spectral filter array 130, the detector array 140 is arranged to receive the arrays of different wavelength filtered lights $178_1$, $178_2$, $178_3$, $178_4$, $178_5$, $178_6$ and convert their intensities into corresponding arrays of electrical signals $180_1$, $180_2$, $180_3$, $180_4$, $180_5$, $180_6$. In this hyperspectral imaging system 100, the length and size of the opening of the slit 124 for the stacked waveguide plates 120 determines the spatial dimension in one direction (e.g., x-direction shown in FIG. 1A), and the width of stacked waveguide plate 120 determines the second spatial dimension in another direction (e.g., z-direction shown in FIG. 1A), and the wavelength passband filters $132_1$, $132_2$, $132_3$, $132_4$, $132_5$, $132_6$ of the spectral filter array 130 determine the spectral resolution of the system. Each of these can be changed to meet the requirements of the specific application of the hyperspectral imaging system 100. To obtain more than an image corresponding to the area 103 of the remote object 104, the remote object 104 can be scanned by the hyperspectral imaging system 100 to sample other areas of remote object 104. A detailed discussion about the different components 110, $120_1$, $120_2$, $120_3$, $120_4$, $120_5$, $120_6$, $120_7$, $120_8$, $120_9$, $120_{10}$, 130, 140, and 150 of the hyperspectral imaging system 100 is provided below.

The Optic 110

The optic 110 (e.g., a lens as shown in FIG. 1A and FIG. 1B) can have a focal length selected to meet the requirements of a particular application (e.g., airborne application, machine vision application) of the hyperspectral imaging system 100. For example, an optic 110 with a focal length of 15-100 mm would typically be used for most applications. The optic 110 could be a standard off-the-shelf lens, but it can also be custom lens depending on the application. The same optic 110 can often be used for different applications such as airborne application and machine vision application.

The Stacked Waveguide Plates 120

Figure 3A:
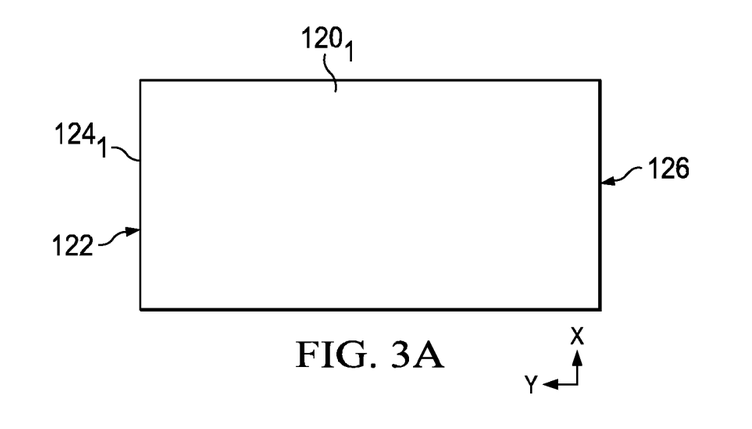
FIG. 3A (top view) and FIG. 3B (side view) illustrate different views of a single waveguide plate in accordance with an embodiment of the present disclosure.
Figure 3B:
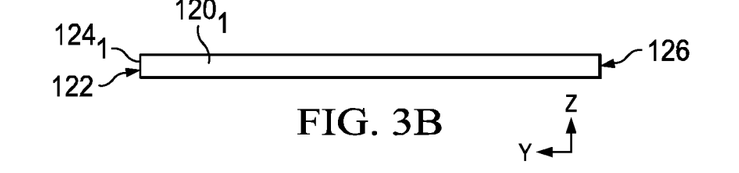

An important feature of the present disclosure, is the multitude of waveguide plates $120_1$, $120_2$, $120_3$, $120_4$, $120_5$, $120_6$, $120_7$, $120_8$, $120_9$, $120_{10}$ that are stacked on top of each other. FIG. 3A (top view) and FIG. 3B (side view) illustrate different views of a single waveguide plate $120_1$ that has a rectangular shape with dimensions that can vary depending on the desired output of dispersed light $176_1$ (note: the other waveguide plates $120_2$, $120_3$, $120_4$, $120_5$, $120_6$, $120_7$, $120_8$, $120_9$, $120_{10}$ are not required to, but would typically also have the same rectangular shape and the same dimensions as waveguide plate $120_i$). For instance, the single waveguide plate $120_1$ could have dimensions in a range of 1 mm-25 mm (length—y-direction), 0.4 mm-15 mm (width—x-direction), and 3 μm-30 μm (thickness—z-direction). As discussed below, the waveguide plates $120_1$, $120_2$, $120_3$, $120_4$, $120_5$, $120_6$, $120_7$, $120_8$, $120_9$, $120_{10}$ can have a thickness which corresponds to the pixel size of the detector array 140 (e.g., camera focal plane array 140), or the thickness can be an arbitrary size. It should be noted that the number of waveguide plates $120_1$, $120_2$, $120_3$, $120_4$, $120_5$, $120_6$, $120_7$, $120_8$, $120_9$, $120_{10}$ could be arbitrary or could match the longer or shorter dimension of the detector array that is being used.

Figure 3C:
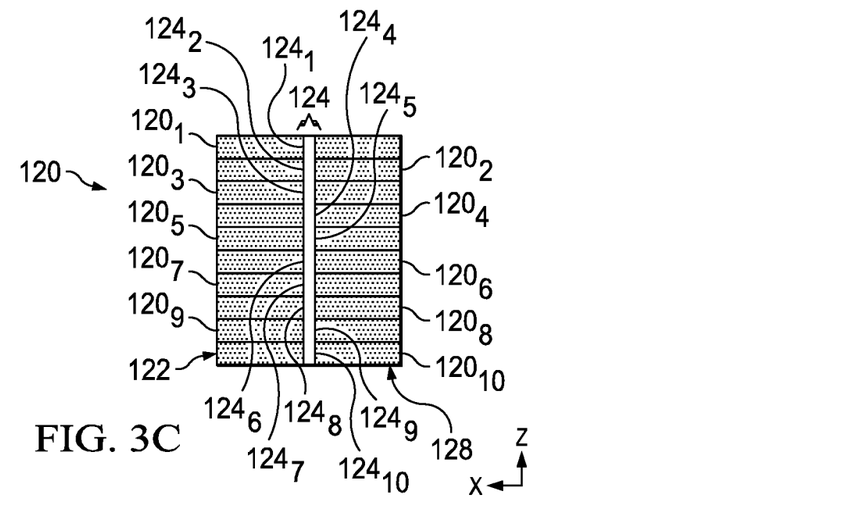
FIG. 3C (end view) and FIG. 3D (side view) illustrate different views of the stacked waveguide plates in accordance with an embodiment of the present disclosure.
Figure 3D:
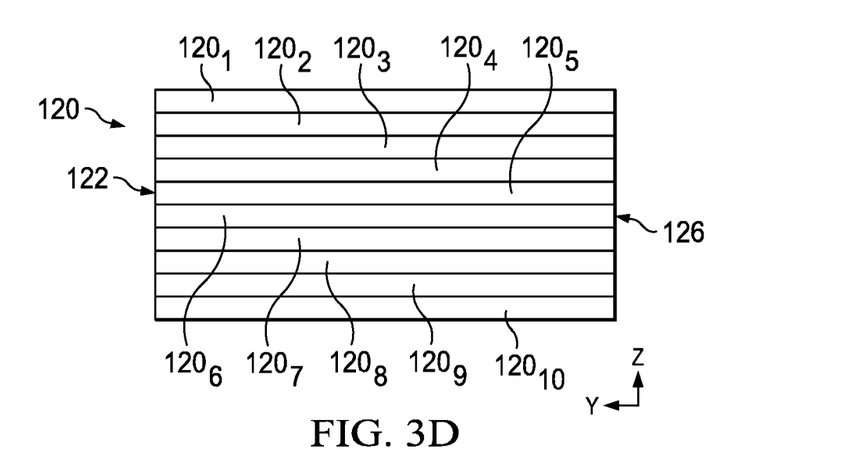

FIG. 3C (end view) and FIG. 3D (side view) illustrate different views of the stacked waveguide plates 120. Each waveguide plate $120_1$, $120_2$, $120_3$, $120_4$, $120_5$, $120_6$, $120_7$, $120_8$, $120_9$, $120_{10}$ has a single entrance pupil $124_1$, $124_2$, $124_3$, $124_4$, $124_5$, $124_6$, $124_7$, $124_8$, $124_9$, $124_{10}$ which collectively form the slit 124 on the entrance end 122 of the stacked waveguide plates 120 (see FIG. 2D). The slit 124 could be made by cutting through a coating 128 (e.g. a reflective coating or paint applied to the entrance end 122 of each of the waveguide plates $120_1$, $120_2$, $120_3$, $120_4$, $120_5$, $120_6$, $120_7$, $120_8$, $120_9$, $120_{10}$)(note: the coating 128 is only shown (shaded area) on the entrance end 122 of the stacked waveguide plates 120 in FIG. 3C, but the coating 128 could be applied to all or a portion of the exterior surfaces of the waveguide plates $120_1$, $120_2$, $120_3$, $120_4$, $120_5$, $120_6$, $120_7$, $120_8$, $120_9$, $120_{10}$). Alternatively, the slit 124 could be made by masking a slit shape on the entrance end 122 of the stacked waveguide plates 120 and then applying the coating 128 on at least the entrance end 122 of the stacked waveguide plates 120 and removing the mask to expose the slit 124. In yet another alternative, the slit 124 could be made by using a lithography printing process where the entrance end 122 of the stacked waveguide plates 120 is treated to repel the coating 128 in the area of the slit 124, while the remaining area of the entrance end 122 and possibly other exterior surfaces of the stacked waveguide plates 120 would attract the coating 128.

Figure 3E:
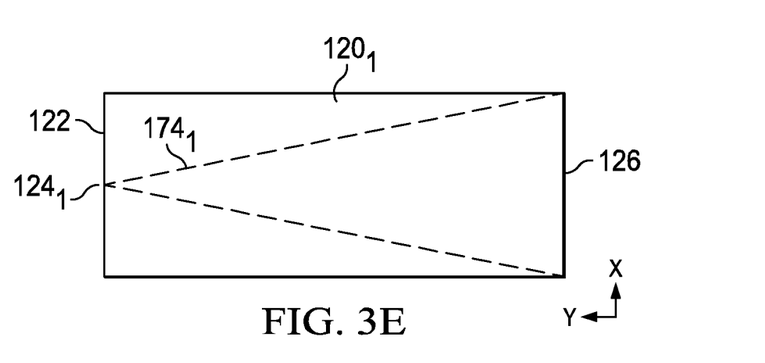
FIG. 3E (top view) illustrates a beam path of light which enters a waveguide plate and passes through the waveguide plate in accordance with an embodiment of the present disclosure.

FIG. 3E (top view) shows a beam path of light $174_1$ which entered the waveguide plate $120_1$ through its portion of the slit 124 (or entrance pupil $124_1$), dispersed within the waveguide plate $120_1$ based on the focal length of the optic 110 in one axis, and outputted from the waveguide plate $120_1$ as the dispersed light $176_1$ (see also FIG. 1A and FIG. 1B). The other waveguide plates $120_2$, $120_3$, $120_4$, $120_5$, $120_6$, $120_7$, $120_8$, $120_9$, $120_{10}$ would have a similar beam path where the light $174_i$ which entered through their respective portion of the slit 124 (or entrance pupils $124_2$, $124_3$, $124_4$, $124_5$, $124_6$, $124_7$, $124_8$, $124_9$, $124_{10}$) on the entrance end 122, dispersed within the respective waveguide plate $120_2$, $120_3$, $120_4$, $120_5$, $120_6$, $120_7$, $120_8$, $120_9$, $120_{10}$ based on the focal length of the optic 110 in only one axis, and outputted from the respective waveguide plate $120_2$, $120_3$, $120_4$, $120_5$, $120_6$, $120_7$, $120_8$, $120_9$, $120_{10}$ as multiple dispersed lights $176_2$, $176_3$, $176_4$, $176_5$, $176_6$, $176_7$, $176_8$, $176_9$, $176_{10}$ (see also FIG. 1A and FIG. 1B). That is, the stacked waveguide plates 120 will collect light 174 via the slit 124 and each waveguide plate $120_1$, $120_2$, $120_3$, $120_4$, $120_5$, $120_6$, $120_7$, $120_8$, $120_9$, $120_{10}$ will disperse the light 174 in only 1 axis and output respective dispersed lights $176_2$, $176_3$, $176_4$, $176_5$, $176_6$, $176_7$, $176_8$, $176_9$, $176_{10}$.

The waveguide plates $120_1$, $120_2$, $120_3$, $120_4$, $120_5$, $120_6$, $120_7$, $120_8$, $120_9$, $120_{10}$ could be made from a material that includes (for example): (i) transmissive glass materials such as fused silica, BK7 and others; (ii) crystal materials such as bariumfluoride, calciumfluoride, zinc selenide, zinc sulfide, and others; and (iii) germanium. The material chosen would typically be based on the manufacturability and the required transmission of the waveguide plates $120_1$, $120_2$, $120_3$, $120_4$, $120_5$, $120_6$, $120_7$, $120_8$, $120_9$, $120_{10}$. Each of the waveguide plates $120_1$, $120_2$, $120_3$, $120_4$, $120_5$, $120_6$, $120_7$, $120_8$, $120_9$, $120_{10}$ can have their top surface, bottom surface and thin sides coated with a reflective coating to reflect more light to the imaging plane (i.e., the detector array 140). Further, the waveguide plates $120_1$, $120_2$, $120_3$, $120_4$, $120_5$, $120_6$, $120_7$, $120_8$, $120_9$, $120_{10}$ could be manufactured like a fiber by starting with a much thicker waveguide that would be needed to be bonded together in a similar way that a fiber is and then the thicker waveguide would be drawn down to the size that is needed for the application. Alternatively, each of the waveguide plates $120_1$, $120_2$, $120_3$, $120_4$, $120_5$, $120_6$, $120_7$, $120_8$, $120_9$, $120_{10}$ could be created by a coating process which includes coating multiple layers of material on top of one another to form each waveguide plate $120_1$, $120_2$, $120_3$, $120_4$, $120_5$, $120_6$, $120_7$, $120_8$, $120_9$, $120_{10}$ of the stacked waveguide plates 120.

The Spectral Filter Array 130

Figure 4:
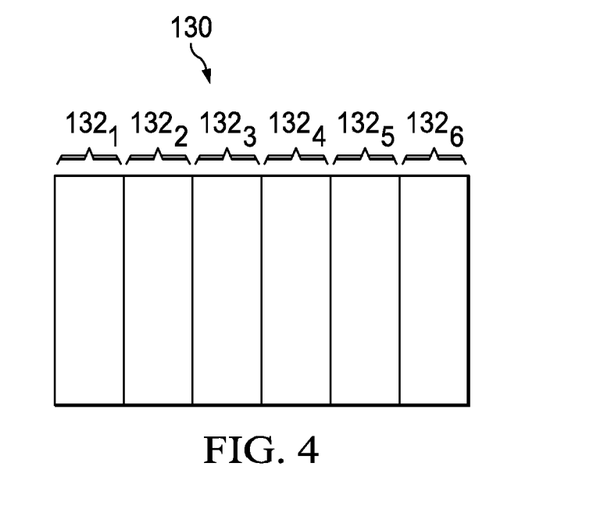
FIG. 4 illustrates a front view of an exemplary spectral filter array configured in accordance with an embodiment of the present disclosure.

FIG. 4 illustrates a front view (i.e., the view adjacent to the exit end 126 of the stacked waveguide plates 120) of an exemplary spectral filter array 130. The exemplary spectral filter array 130 has different wavelength passband filters $132_1$, $132_2$, $132_3$, $132_4$, $132_5$, $132_6$ (only six shown—but there can be any number of passband filters 132) aligned with each waveguide plate $120_1$, $120_2$, $120_3$, $120_4$, $120_5$, $120_6$, $120_7$, $120_8$, $120_9$, $120_{10}$. That is, the spectral filter array 130 will have specific wavelength filters $132_1$, $132_2$, $132_3$, $132_4$, $132_5$, $132_6$ to separate the dispersed light $176_1$, $176_2$, $176_3$, $176_4$, $176_5$, $176_6$, $176_7$, $176_8$, $176_9$, $176_{10}$ into an array of light with a set number of wavelengths (or wavelength bands) along the one axis (note: there would be a set number of wavelengths associated with each dispersed light $176_1$, $176_2$, $176_3$, $176_4$, $176_5$, $176_6$, $176_7$, $176_8$, $176_9$, $176_{10}$). Further, the different wavelength passband filters $132_1$, $132_2$, $132_3$, $132_4$, $132_5$, $132_6$ can have a filter range from an ultraviolet band through a long wave infrared band. Alternatively, the spectral filter array 130 may have a number of rows of different wavelength passband filters $132_i$ which correspond with and are aligned with a number of waveguide plates $120_1$, $120_2$, $120_3$, $120_4$, $120_5$, $120_6$, $120_7$, $120_8$, $120_9$, $120_{10}$ and a number of rows $142_1$, $142_2$, $142_3$, $142_4$, $142_5$, $142_6$, $142_7$, $142_8$, $142_9$, $142_{10}$ of pixels in the detector array 140 (e.g., the spectral filter array 130 may have a matrix of passband filters $132_i$ that correspond to the matrix of pixels 140 in the detector array 140). The spectral filter array 130's different wavelength passband filters $132_1$, $132_2$, $132_3$, $132_4$, $132_5$, $132_6$ determine which wavelengths are passed to the detector array 140 (focal plane array 140).

The Detector Array 140

Figure 5:
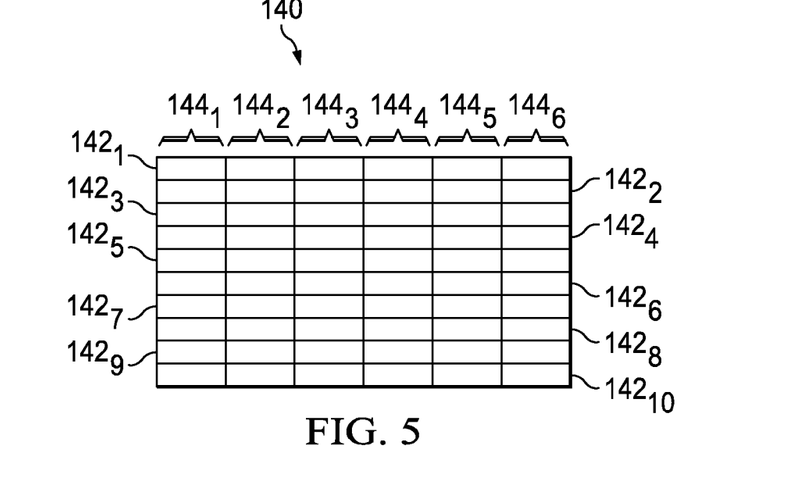
FIG. 5 illustrates a front view of an exemplary detector array configured in accordance with an embodiment of the present disclosure.

FIG. 5 illustrates a front view (i.e., the view adjacent to the output of the spectral filter array 130) of an exemplary detector array 140 (e.g., camera focal plane array 140). The detector array 140 has multiple rows $142_1$, $142_2$, $142_3$, $142_4$, $142_5$, $142_6$, $142_7$, $142_8$, $142_9$, $142_{10}$ (only ten rows shown—but there can be any number of rows) of pixels $144_1$, $144_2$, $144_3$, $144_4$, $144_5$, $144_6$ (only six pixels shown—but there can be any number of pixels). In one example, each one of the rows $142_1$, $142_2$, $142_3$, $142_4$, $142_5$, $142_6$, $142_7$, $142_8$, $142_9$, $142_{10}$ of pixels $144_1$, $144_2$, $144_3$, $144_4$, $144_5$, $144_6$ is aligned with each one of the waveguide plates $120_1$, $120_2$, $120_3$, $120_4$, $120_5$, $120_6$, $120_7$, $120_8$, $120_9$, $120_{10}$.

The Controller 150

The controller 150 is operable to (i) receive the multiple arrays of electrical signals $180_1$, $180_2$, $180_3$, $180_4$, $180_5$, $180_6$ from the detector array 140; (ii) process the multiple arrays of electrical signals $180_1$, $180_2$, $180_3$, $180_4$, $180_5$, $180_6$ to generate the hyperspectral image 102 of the area 103 of the remote object 104; and (iii) output the hyperspectral image 102 of the area 103 of the remote object 104. In one example, the controller 150 may comprise a processor 152 and a memory 154 that stores processor-executable instructions, wherein the processor 152 interfaces with the memory 154 to execute the processor-executable instructions, whereby the controller 150 is operable to (i) receive the multiple arrays of electrical signals $180_1$, $180_2$, $180_3$, $180_4$, $180_5$, $180_6$ from the detector array 140; (ii) process the multiple arrays of electrical signals $180_1$, $180_2$, $180_3$, $180_4$, $180_5$, $180_6$ to generate the hyperspectral image 102 of the area 103 of the remote object 104; and (iii) output the hyperspectral image 102 of the area 103 of the remote object 104.

Figure 6A:
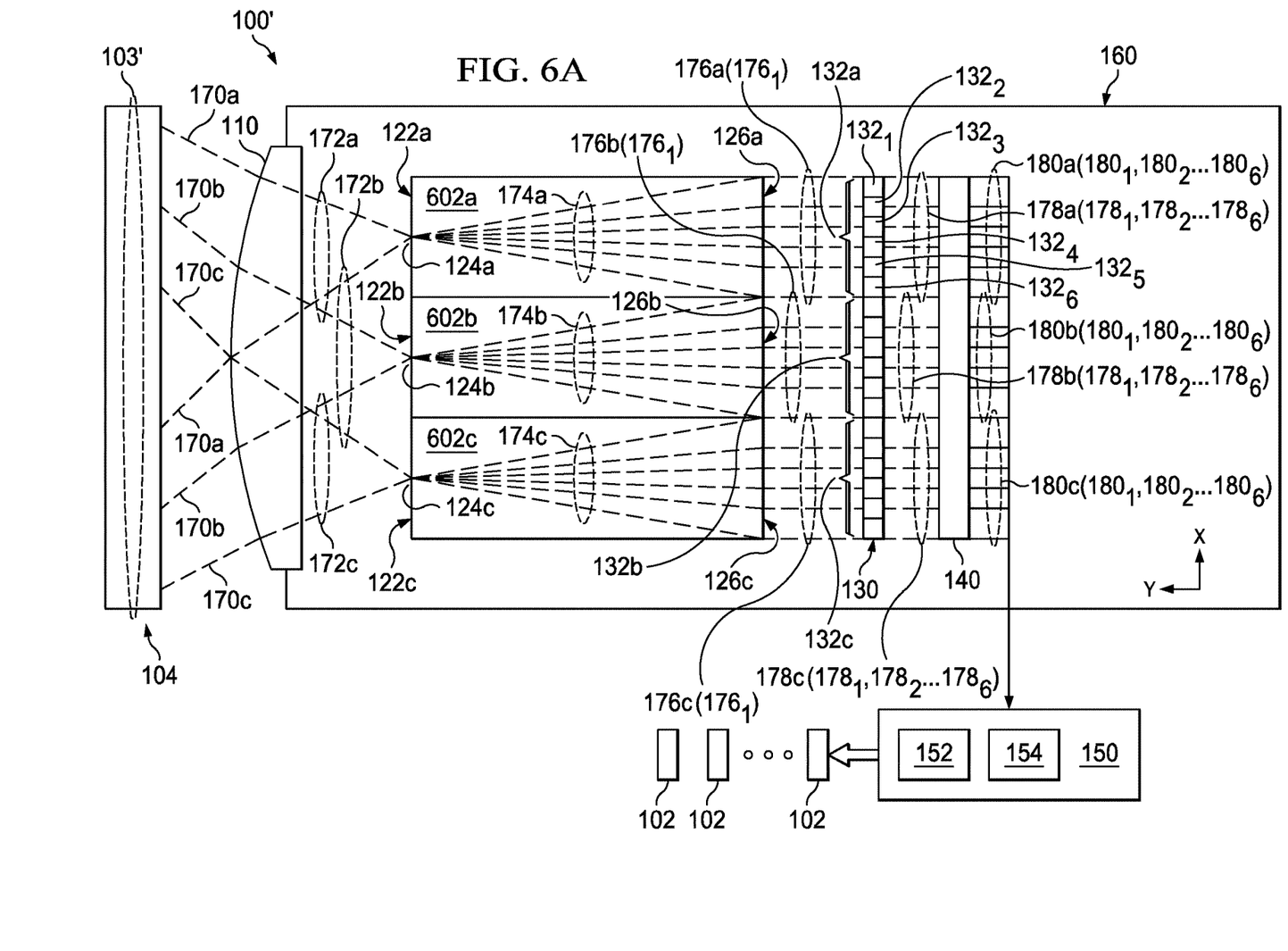
FIG. 6A (top view) and FIG. 6B (side view) illustrate the basic components of another exemplary hyperspectral imaging system configured to provide a hyperspectral image of an area of a remote object in accordance with an embodiment of the present disclosure.
Figure 6B:
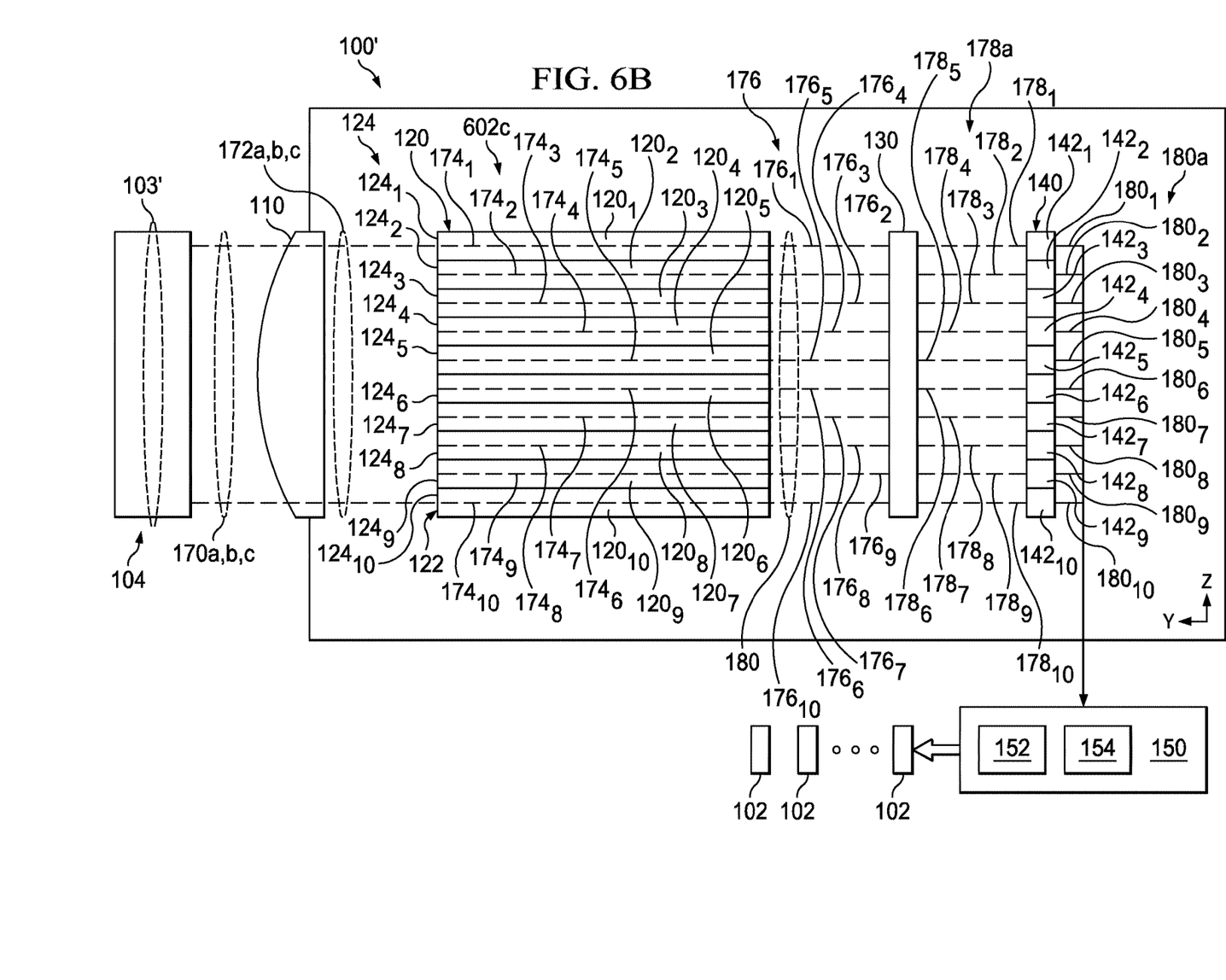

Referring to FIG. 6A and FIG. 6B, there are diagrams illustrating the basic components of another exemplary hyperspectral imaging system 100' configured to provide a hyperspectral image 102 of an area 103' of a remote object 104 in accordance with another embodiment of the present disclosure. As shown in FIG. 6A (top view) and FIG. 6B (side view), the hyperspectral imaging system 100' includes a optic 110 (e.g., a lens), multiple stacked waveguide plates 602a, 602b, 602c (only three stacked waveguide plates 602a, 602b, 602c are shown where each stack has 10 waveguide plates $120_1$, $120_2$, $120_3$, $120_4$, $120_5$, $120_6$, $120_7$, $120_8$, $120_9$, $120_{10}$—but there can be any number of stacked waveguide plates $602_i$ with any number of waveguide plates $120_i$), a spectral filter array 130 (with multiple sets $132a$, $132b$, $132c$ of different wavelength passband filters $132_1$, $132_2$, $132_3$, $132_4$, $132_5$, $132_6$), a detector array 140 (e.g., camera focal plane array 140), and a controller 150. Each of stacked waveguide plates 602a, 602b 602c have an entrance end $122_a$, $122_b$, $122_c$ with a slit 124a, 124b, 124c formed thereon, and an exit end $126_a$, $126_b$, $126_c$ which is opposite the respective entrance end $122_a$, $122_b$, $122_c$ (note each one of the stacked waveguide plates 602a, 602b, 602c includes multiple waveguide plates $120_1$, $120_2$, $120_3$, $120_4$, $120_5$, $120_6$, $120_7$, $120_8$, $120_9$, $120_{10}$ (only ten shown—but can be any number)) The multiple stacked waveguide plates 602a, 602b, 602c are positioned between the optic 110 and the spectral filter array 130. The spectral filter array 130 is positioned between the multiple stacked waveguide plates 602a, 602b, 602c and the detector array 140. The controller 150 is coupled to the detector array 140. Furthermore, the hyperspectral imaging system 100' may include a housing 160 which encloses and supports the optic 110, the multiple stacked waveguide plates 602a, 602b, 602c, the spectral filter array 130, and the detector array 140. In this example, the controller 150 is shown as being positioned outside of the housing 160, but is still operatively coupled to at least the detector array 140. The hyperspectral imaging system 100' can incorporate other components which are well known to those skilled in the art, but for clarity only those components 110, 602a, 602b, 602c, 130, 140, and 150 which are needed to explain and enable the present disclosure are (or have been) discussed in detail herein.

In operation, the hyperspectral imaging system 100' is positioned with respect to the remote object 104 such that the optic 110 is able to receive light 170a, 170b, 170c associated with an area 103' of the remote object 104, and output light 172a, 172b, 172c associated with the area 103' of the remote object 104. Each slit 124a, 124b, 124c located on the entrance ends 122a, 122b, 122c of the multiple stacked waveguide plates 602a, 602b, 602c respectively receives at least a portion of the light 172a, 172b, 172c which is output from the optic 110. Each exit end 126a, 126b, 126c of the stacked waveguide plates 602a, 602b, 602c respectively outputs a set 176a, 176b, 176c of multiple dispersed lights $176_1$, $176_2$, $176_3$, $176_4$, $176_5$, $176_6$, $176_7$, $176_8$, $176_9$, $176_{10}$ (e.g., one dispersed light 176 is output from each one of the waveguide plates $120_1$, $120_2$, $120_3$, $120_4$, $120_5$, $120_6$, $120_7$, $120_8$, $120_9$, $120_{10}$). The spectral filter array 130 receives the multiple sets 176a, 176b, 176c of dispersed lights $176_1$, $176_2$, $176_3$, $176_4$, $176_5$, $176_6$, $176_7$, $176_8$, $176_9$, $176_{10}$ output from the exit ends 126a, 126b, 126c of the stacked waveguide plates 602a, 602b, 602c, and outputs multiple sets 178a, 178b, 178c of multiple arrays of different wavelength filtered lights $178_1$, $178_2$, $178_3$, $178_4$, $178_5$, $178_6$ (e.g., 3 sets 178 (which correspond to 3 stacked waveguide plates 120) of 10 arrays (which correspond to the 10 waveguide plates) of 6 different filtered lights 178 are shown—but there can be any number of sets and any number of arrays and any number of different wavelength filtered lights 178). The detector array 140 receives the multiple sets 178a, 178b, 178c of the multiple arrays of different wavelength filtered lights $178_1$, $178_2$, $178_3$, $178_4$, $178_5$, $178_6$ from the spectral filter array 130, and outputs multiple sets 180a, 180b, 180c of arrays of electrical signals $180_1$, $180_2$, $180_3$, $180_4$, $180_5$, $180_6$ (e.g. 3 sets of 10 arrays of 6 electrical signals 180 corresponding to the 3 sets of 10 arrays of 6 wavelength filtered lights 178 are shown—but there can be any number of sets, any number of arrays and any number of electrical signals 180). The controller 150 receives the multiple sets 180a, 180b, 180c of multiple arrays of electrical signals $180_1$, $180_2$, $180_3$, $180_4$, $180_5$, $180_6$ from the detector array 140. The controller 150 then processes the received multiple sets 180a, 180b, 180c of multiple arrays of electrical signals $180_1$, $180_2$, $180_3$, $180_4$, $180_5$, $180_6$ to generate the hyperspectral image 102 of the area 103' of the remote object 104. Thereafter, the controller 150 outputs the hyperspectral image 102 of the area 103' of the remote object 104. The hyperspectral imaging system 100' can be repeatedly operated in the above described manner to obtain different hyperspectral images 102 of different areas 103' of the remote object 104.

The hyperspectral imaging system 100' with multiple sets of stacked waveguide filters 602a, 602b, 602c used in parallel as shown enables multiple sets of spatial rows to be acquired at the same time or could be used in conjunction with different waveguide dimensions to allow for different spatial or spectral resolutions at the same time. For instance, the first stacked waveguide filter 602a could collect 400 nm-1000 nm in 20 nm band widths, while the second stacked waveguide filter 602b could collect 400 nm-1000 nm in 2 nm bands, and the third stacked waveguide filter 602c could collect 400 nm-1000 nm in 1 nm bands. Different wavelength ranges could also be used like e.g., 500 nm-600 nm in 2 nm bands while a different waveguide collects 600 nm-1000 nm in 10 nm bands. This could also be done for different spatial resolutions as follows: The first stacked waveguide filter 602a could collect 400 nm-1000 nm with individual waveguides width of a single pixel, say 5 µm, while the second stacked waveguide filter 602b could collect 400 nm-1000 nm with individual waveguide widths of two pixels, 10 µm, and the third stacked waveguide filter 602c could collect 400 nm-1000 nm with individual waveguide width of 4 pixels, 20 µm. This would enable the ability to choose different spatial resolutions.

The spectral filter array 130 can be attached directly to the exit ends 126a, 126b, 126c of the stacked waveguide plates 602a, 602b, 602c and/or to the detector array 140 (note: the same is true for the hyperspectral imaging system 100). The detector array 140 (e.g., a camera) may have quantum efficiencies that are uneven spectrally and to address this issue the spectral filter array 130 could be arranged such that these higher illuminated areas could be matched with the lower quantum efficiency wave lengths of the detector array 140 (e.g. a focal plane array). This would even out the spectral intensities on the detector array 140. Plus, this allows for a higher signal strength in the lower quantum efficiency areas (typically 380 nm-450 nm and 700 nm-1000 nm on Si chips) of the detector array 140. Further, because of the geometry of the stacked waveguide plates 602a, 602b, 602c, it is likely that the center of the stacked waveguide plates 602a, 602b, 602c will receive more light than the edges of the stacked waveguide plates 602a, 602b, 602c (e.g. uneven in the x-dimension). This being said, the different wavelength passband filters $132_1$, $132_2$, $132_3$, $132_4$, $132_5$, $132_6$ of spectral filter array 130 could be arranged such that the higher illuminated areas are matched with the lower camera quantum efficiencies (such as >700 nm or <450 nm on Si chips) of the detector array 140.

In view of the foregoing discussions of the hyperspectral imaging systems 100 and 100', it can be appreciated that one or more stacked waveguide plates 120, 602a, 602b, 602c used in conjunction with the spectral filter array 130 and the detector array 140 can transform a slit image to a plurality of spectral slices of the area 103 of the remote object 104. The waveguides plates $120_1$, $120_2$, $120_3$, $120_4$, $120_5$, $120_6$, $120_7$, $120_8$, $120_9$, $120_{10}$ can be different shapes, but are typically rectangular shape and can have different entrance apertures $124_1$, $124_2$, $124_3$, $124_4$, $124_5$, $124_6$, $124_7$, $124_8$, $124_9$, $124_{10}$ to match the particular pixel sizes of the detector array 140. If desired, the number of waveguide plates $120_1$, $120_2$, $120_3$, $120_4$, $120_5$, $120_6$, $120_7$, $120_8$, $120_9$, $120_{10}$ can correspond to the number of rows $142_1$, $142_2$, $142_3$, $142_4$, $142_5$, $142_6$, $142_7$, $142_8$, $142_9$, $142_{10}$ of pixels in the detector array 140 in order to maximize spatial resolution. The stacked waveguide plates 120, 602a, 602b, 602c allow for a compact broadband spreading device.

If desired, multiple stacked waveguide plates 602a, 602b, 602c with multiple slits 124a, 124b, 124c can be used to create multiple lines of scanning as discussed above with respect to the hyperspectral imaging system 100' (see FIG. 6A and FIG. 6B). In this case, the separate parallel stacked waveguide plates 602a, 602b, 602c allow for different spatial and spectral resolutions to be acquired at the same time. This in turn allows for faster acquisition of a hyperspectral cube (multiple images 102) associated with the remote object 104.

The spectral filter array 130 can be attached directly to the stacked waveguide plate(s) 120, 602a, 602b, 602c or to the detector array 140. Alternatively, the spectral filter array 130, the stacked waveguide plate(s) 120, 602a, 602b, 602c, and the detector array 140 could be bonded together and have no air gap.

If desired, an imaging lens could be placed between the stacked waveguide plate(s) 120, 602a, 602b, 602c and the detector array 140 to collimate the dispersed light $176_1$, $176_2$, $176_3$, $176_4$, $176_5$, $176_6$, $176_7$, $176_8$, $176_9$, $176_{10}$ output from the stacked waveguide plate(s) 120, 602a, 602b, 602c or to change the projected output of the dispersed light $176_1$, $176_2$, $176_3$, $176_4$, $176_5$, $176_6$, $176_7$, $176_8$, $176_9$, $176_{10}$ from the stacked waveguide plate(s) 120, 602a, 602b, 602c. Alternatively, an imaging lens (or yet another imaging lens) could be placed between the spectral filter array 130 and the detector array 140.

If desired, the stacked waveguide plate(s) 120, 602a, 602b, 602c could have an entrance end 122, 122a, 122b, 122c coated to be reflective so that any light 174, 174a, 174b, 174c inside the waveguide plates $120_1$, $120_2$, $120_3$, $120_4$, $120_5$, $120_6$, $120_7$, $120_8$, $120_9$, $120_{10}$ that is reflected back from the spectral filter array 130 could be recycled to end up at a different location on the spectral filter array 130 so that all the light 174, 174a, 174b, 174c ends up being received by the spectral filter array 130. That is, without a reflective coating, the light that is reflected by the spectral array filter 130 could propagate towards the top of the waveguide plates $120_1$, $120_2$, $120_3$, $120_4$, $120_5$, $120_6$, $120_7$, $120_8$, $120_9$, $120_{10}$ and be lost. Thus, a reflective coating will reflect that light back to the spectral filter array 130, thus limiting the loss of light and increasing the signal strength to improve performance.

The present disclosure enables one to make inexpensive and compact hyperspectral imaging system 100 and 100'. Plus, the present disclosure allows the hyperspectral imaging system 100 and 100' to function like both the scalable filter solution and the complex optical system that were described in the background section and as such essentially have the best features of both technologies. For instance, the hyperspectral imaging system 100 and 100' implements a filtered solution which has the advantage of size and cost, while functioning similar to a complex optical system (Offner/Dyson system) by collecting all the wavelengths at once to reduce processing time and errors in the imaging data. Further, the hyperspectral imaging system 100 and 100' also allows for a much higher spatial resolution system than is available from the traditional Offner/Dyson solution.

The hyperspectral imaging system 100 and 100' also allows the collection of a slice of an image 102 of the remote object 104 with all of the wavelength information similar to a typical Offner or Dyson spectrometer. However, the size and cost of the hyperspectral imaging system 100 and 100' could be similar to a filter based solution described in the background section that has either very limited spatial/spectral resolution or needs to scan to get every wavelength. The hyperspectral imaging system 100 and 100' has the following advantages (for example): (i) reduced cost and size over spectrometer-based designs; and (ii) better image capture of a moving remote object 104 in e.g., an airborne application or machine vision application than the filter-based designs described in the background section.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an opening" includes examples having two or more such "openings" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 10 mm" and "a dimension less than about 10 mm" both include embodiments of "a dimension less than about 10 mm" as well as "a dimension less than 10 mm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims.

The invention claimed is:

1. A hyperspectral imaging system comprising:
    an optic;
    first stacked waveguide plates, the first stacked waveguide plates comprising a first plurality of waveguide plates stacked on top of one another, each of the first plurality of waveguide plates being configured to disperse light that is output from the optic;
    a first slit located on the first stacked waveguide plates;
    a spectral filter array configured to receive the dispersed light from the first stacked waveguide plates and output multiple arrays of different wavelength filtered light; and
    a detector array configured to receive the multiple arrays of different wavelength filtered light from the spectral filter and output multiple arrays of electrical signals,
    wherein the first stacked waveguide plates are positioned between the optic and the spectral filter array, and wherein the spectral filter array is positioned between the first stacked waveguide plates and the detector array.

2. The hyperspectral imaging system of claim 1, further comprising a controller coupled to the detector array.

3. The hyperspectral imaging system of claim 1, further comprising:
    second stacked waveguide plates, the second stacked waveguide plates comprising a second plurality of waveguide plates stacked on top of one another; and
    a second slit located on the second stacked waveguide plates,
    wherein the second stacked waveguide plates are positioned adjacent to the first stacked waveguide plates, and wherein the second stacked waveguide plates are positioned between the optic and the spectral filter array, and wherein the spectral filter array is positioned between the second stacked waveguide plates and the detector array.

4. The hyperspectral imaging system of claim 1, wherein the first stacked waveguide plates have an entrance end, the entrance end having a coating located thereon, the coating configured to form the first slit.

5. The hyperspectral imaging system of claim 1, wherein each of the first plurality of waveguide plates has a rectangular shape.

6. The hyperspectral imaging system of claim 1, wherein each of the first plurality of waveguide plates has an entrance pupil, the entrance pupil forming a portion of the first slit.

7. The hyperspectral imaging system of claim 1, wherein each of the first plurality of waveguide plates is made from one of: (i) a transmissive glass material; (ii) a transmissive crystal material; and (iii) germanium.

8. The hyperspectral imaging system of claim 1, wherein the spectral filter array comprises a plurality of different wavelength passband filters, the passband filters being aligned with each of the first plurality of waveguide plates.

9. The hyperspectral imaging system of claim 8, wherein the plurality of different wavelength passband filters has a wavelength filter range from an ultraviolet band through a long wave infrared band.

10. The hyperspectral imaging system of claim 1, wherein the detector array comprises a plurality of rows of pixels, wherein each of the rows of pixels is aligned with each of the first plurality of waveguide plates.

11. The hyperspectral imaging system of claim 10, wherein each of the rows of pixels has a thickness that matches a thickness of one of the first plurality of waveguide plates.

12. A method for providing a hyperspectral image of an area of a remote object, the method comprising the steps of:
providing a hyperspectral imaging system comprising:
an optic;
stacked waveguide plates, the stacked waveguide plates comprising a plurality of waveguide plates stacked on top of one another, the stacked waveguide plates having an entrance end and an exit end opposite the entrance end;
a slit located on the entrance end of the stacked waveguide plates;
a spectral filter array;
a detector array, wherein the stacked waveguide plates are positioned between the optic and the spectral filter array, and wherein the spectral filter array is positioned between the stacked waveguide plates and the detector array; and
a controller coupled to the detector array;
positioning the hyperspectral imaging system with respect to the remote object system such that:
the optic receives light associated with the area of the remote object, and outputs light associated with the area of the remote object;
the slit receives at least a portion of the light output from the optic and the stacked waveguide plates output multiple dispersed lights at the exit end, wherein each of the plurality of waveguide plates outputs one of the multiple dispersed lights;
the spectral filter array receives the multiple dispersed lights output from the exit end of the stacked waveguide plates, and outputs multiple arrays of different wavelength filtered lights, wherein each of the multiple dispersed lights is associated with one of the multiple arrays of different wavelength filtered lights;
the detector array receives the multiple arrays of different wavelength filtered lights from the spectral filter array and outputs multiple arrays of electrical signals, wherein each of the multiple arrays of different wavelength filtered lights is associated with one of the multiple arrays of electrical signals; and,
the controller receives the multiple arrays of electrical signals from the detector array, combines the multiple arrays of electrical signals to generate the hyperspectral image of the area of the remote object, and outputs the hyperspectral image of the area of the remote object.

13. The method of claim 12, further comprising repeatedly operating the hyperspectral imaging system to generate and output a plurality of hyperspectral images of a plurality of different areas of the remote object.

14. The method of claim 12, wherein the entrance end has a coating located thereon, the coating configured to form the slit.

15. The method of claim 12, wherein each of the plurality of waveguide plates has a rectangular shape.

16. The method of claim 12, wherein each of the plurality of waveguide plates has an entrance pupil, the entrance pupil forming a portion of the slit.

17. The method of claim 12, wherein each of the plurality of waveguide plates is configured to disperse the light output from the optic in only one dimension.

18. The method of claim 12, wherein the spectral filter array comprises a plurality of different wavelength passband filters, the passband filters being aligned with each of the waveguide plates.

19. The method of claim 12, wherein the detector array comprises a plurality of rows of pixels, wherein each of the rows of pixels is aligned with each of the waveguide plates.

20. A waveguide comprising:
stacked waveguide plates, the stacked waveguide plates comprising a plurality of waveguide plates stacked on top of one another, each of the plurality of waveguide plates being configured to disperse light, the stacked waveguide plates each having an entrance end, a rectangular shape, and an entrance pupil located on the entrance end; and
a coating on the entrance end of the stacked waveguide plates such that a continuous slit extends through the coating on the entrance end of each of the stacked waveguide plates, the slit comprising the entrance pupils.

* * * * *